INVENTOR:
JERRY D. WILSON,
BY *Henry T. Olsen*
HIS ATTORNEY.

United States Patent Office 3,328,654
Patented June 27, 1967

3,328,654
CAPACITOR WITH A POLYCARBONATE DIELECTRIC
Jerry D. Wilson, Glens Falls, N.Y., assignor to General Electric Company, a corporation of New York
Filed Dec. 27, 1965, Ser. No. 516,418
3 Claims. (Cl. 317—258)

This invention relates to capacitors, and more particularly to new organic dielectric films for capacitors.

The use of polymeric films in capacitors is advantageous since such films can be readily and economically produced in thicknesses of the order of 0.3 of a mil, or less, while still providing good mechanical strength and high dielectric strength. It is an object of this invention to provide a capacitor with dielectric films exhibiting such characteristics.

It is a still further object of this invention to provide a new capacitor having a dielectric film of polycarbonate resin of low intrinsic viscosity having dissipation characteristics which improve at high temperatures.

In accordance with the invention there is provided a capacitor comprising a pair of conductive electrodes separated by a polycarbonate resin film, said polycarbonate resin being selected from the group consisting of tetrachloro bisphenol A resin, bisphenol C resin, bisphenol A branched with 0.75% diphenolic acid and its copolymers with tetramethyl bisphenol A resin and tetrabromo bisphenol A resin.

Further objects and advantages of the invention will be understood as the following description proceeds and from the drawings wherein.

Figure 1:
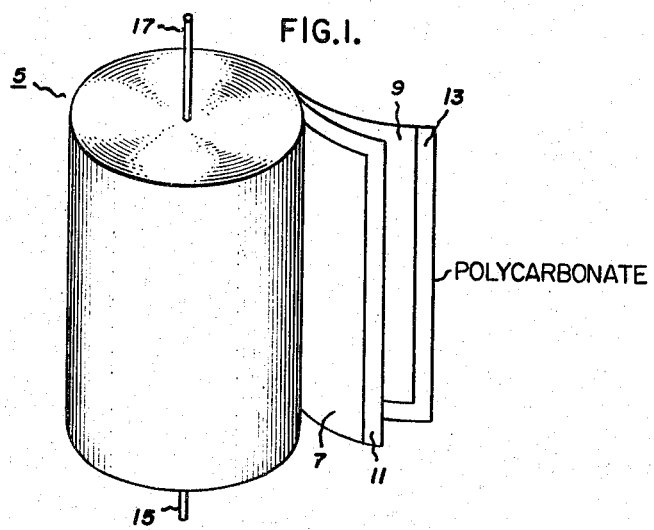
FIG. 1 is a perspective view of a capacitor roll embodying the invention.

As illustrated in FIG. 1, the capacitor embodying the invention comprises a capacitor roll 5 which includes a pair of conductive electrodes 7, 9 and a pair of dielectric polycarbonate resin films 11, 13. The pair of conductive electrodes 7, 9 as illustrated are metallized films of gold, aluminum, etc., on the dielectric film but may be separate foils of suitable conductive material. A pair of suitable leads 15, 17 are connected to electrodes 7 and 9, respectively, each of said electrodes terminating adjacent one edge only of the dielectric sheets so as to facilitate this connection.

The dielectric sheets 11 and 13 are of polycarbonate resins having good mechanical strength and high dielectric constructed in accordance with the following examples:

*Example I*

Figure 2:
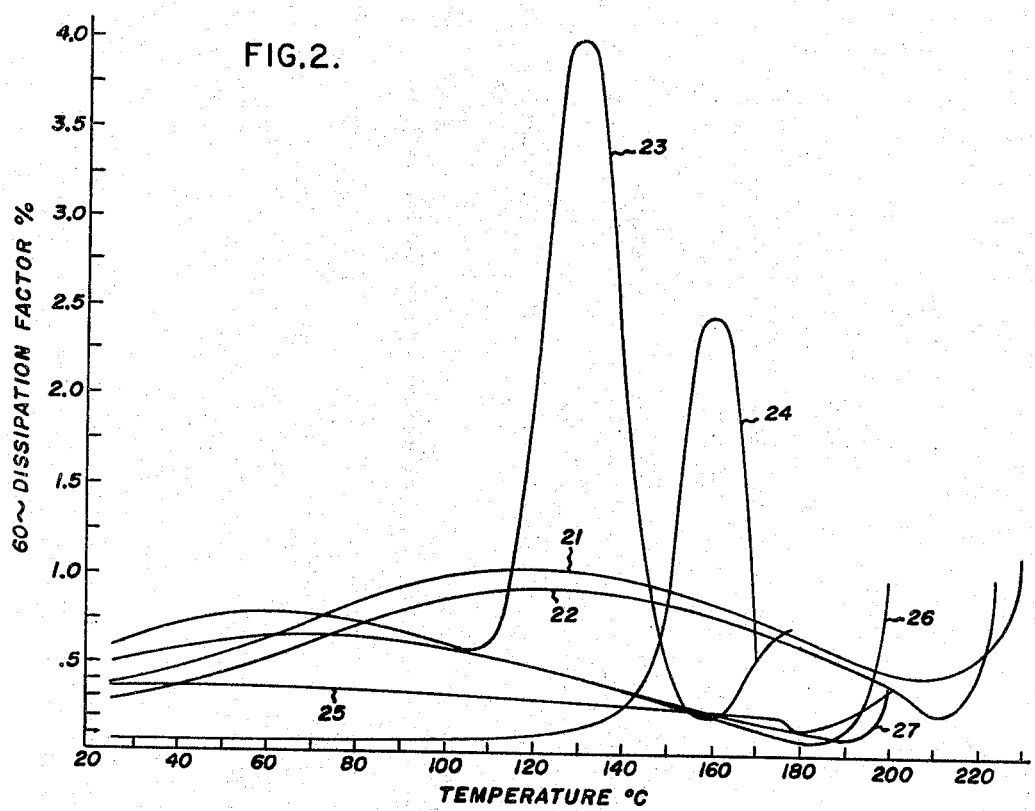
FIG. 2 illustrates the effect of temperature on the percent dissipation in capacitors embodying the invention.

Tetrachlorobisphenol A resin having an intrinsic viscosity of 0.66 was compression molded to form a film .0243 inch in average thickness. The film was provided with metallized gold electrodes by vapor deposition and heat treated under vacuum at 140° C. for 16 hours. The capacitor was allowed to stabilize thermally to room temperature in a dry nitrogen atmosphere. For test purposes, the capacitor was placed in a forced air oven and the percent dissipation tested as the temperature of the capacitor increased with the results as illustrated by curve 21 of FIG. 2. The dissipation factor is calculated by use of the following:

Percent dissipation factor=tan $\delta \times 100$, where $\delta$ is the measured phase angle.

*Example II*

Tetrachlorobisphenol A resin having an intrinsic viscosity of 0.56 was compression molded to form a film .0193 inch in average thickness and incorporated in a capacitor and tested as in Example I. The percent dissipation with respect to temperature is illustrated by curve 22.

*Examples III and IV*

Bisphenol C resin and branched BPA resin (bisphenol A branched with 0.75% diphenolic acid) each having a viscosity of .54 were compression molded into films of having an average thickness of .0154 and .013 inch, respectively, incorporated in capacitors and tested as in Example I. Curves 23 and 24 illustrate the percent dissipation found for the capacitors utilizing the bisphenol C and the BPA dielectric, respectively.

*Examples V–VII*

Three polycarbonate copolymers were molded into films and incorporated in capacitors as in Example I. Example V was a blend of 90 mol percent tetramethylbisphenol A resin and 10 mol percent BPA resin having an intrinsic viscosity of .62, while Examples VI and VII were blends of 50 mol percent tetrabromobisphenol A resin and 50 mol percent of BPA resin having intrinsic viscosities of 0.62 and 0.53, respectively. The dissipation factors for Examples V, VI and VII are illustrated in curve 25, 26 and 27 respectively.

It will be noted that each of the examples illustrated that a marked reduction in percent dissipation occurs above approximately 150° C. and since the dielectric materials are particularly flame resistant, a capacitor suitable for certain high temperature purposes is provided. While the copolymers of Examples V–VII have been found to be preferred on the basis of overall characteristics, the others could be used advantageously in selected applications, particularly in DC circuits.

While the invention has been described by way of its preferred embodiment, it will be noted that it may be practiced in any type of capacitor without departing from the spirit and scope of the appended claims.

What is claimed as new and desired to be secured by Letters Patent of the United States is:

1. A capacitor comprising a pair of conductive electrodes separated by a bisphenol polycarbonate resin dielectric film, said film characterized by an intrinsic viscosity less than 0.70.

2. A capacitor as recited in claim 1 wherein said polycarbonate resin film is one selected from the group consisting of tetrachlorobisphenol A resin, bisphenol C resin, branched bisphenol A resin, and copolymers of bisphenol A resin with tetramethylbisphenol A resin or tetrabromobisphenol A resin.

3. A capacitor as recited in claim 1 wherein said polycarbonate resin film is selected from the group consisting of copolymers of bisphenol A resin and 10–90 mol percent tetramethylbisphenol A resin; and bisphenol A resin and 10–90 mol percent tetrabromobisphenol A resin.

References Cited

UNITED STATES PATENTS 2,950,266  8/1960  Goldblum _____ 161—183
3,049,651  8/1962  Adelson _____ 312—258

LEWIS H. MYERS, *Primary Examiner.*
E. GOLDBERG, *Assistant Examiner.*